US008532266B2

(12) United States Patent
Geldenbott et al.

(10) Patent No.: US 8,532,266 B2
(45) Date of Patent: Sep. 10, 2013

(54) EFFICIENT USAGE OF EMERGENCY SERVICES KEYS

(75) Inventors: Gerhard Geldenbott, Seattle, WA (US); John Gordon Hines, Kirkland, WA (US); Yinjun Zhu, Kirkland, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1410 days.

(21) Appl. No.: 11/797,445

(22) Filed: May 3, 2007

(65) Prior Publication Data

US 2007/0274463 A1     Nov. 29, 2007

Related U.S. Application Data

(60) Provisional application No. 60/797,359, filed on May 4, 2006.

(51) Int. Cl.
*H04M 11/04* (2006.01)
(52) U.S. Cl.
USPC ............ 379/45; 379/38; 379/39; 379/49; 455/456.1
(58) Field of Classification Search
USPC ........................................... 379/37–51
See application file for complete search history.

(56) References Cited

U.S. PATENT DOCUMENTS

| | | |
|---|---|---|
| 1,103,073 A | 7/1914 | O'Connel |
| 4,445,118 A | 4/1984 | Taylor et al. |
| 4,492,828 A | 1/1985 | Martinez |
| 4,651,156 A | 3/1987 | Martinez |
| 4,868,570 A | 9/1989 | Davis |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile |

(Continued)

FOREIGN PATENT DOCUMENTS

| | | |
|---|---|---|
| WO | WO01/45342 | 6/2001 |
| WO | WO02/11407 | 7/2001 |
| WO | WO2004/025941 | 3/2004 |
| WO | WO2005/051033 | 6/2005 |

OTHER PUBLICATIONS

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

(Continued)

*Primary Examiner* — Duc Nguyen
*Assistant Examiner* — Ibraham Sharifzadeh
(74) *Attorney, Agent, or Firm* — William H. Bollman

(57) ABSTRACT

An emergency services key (e.g., ESQK or ESRK) is guaranteed to be available from a limited size ESQK pool, such that an available ESQK is always selected and associated with an ongoing emergency call with no measurable impact to existing calls, even if all ESQK pool members are marked as unavailable. A plurality of ESQKs are grouped into a pool of emergency service keys "ESQK Pool ID", each including anywhere from 1 to N number of ESQKs. Each ESQK preferably has a "Timestamp", and information relating to the specific emergency E911 call ("Call Data ID"). The ESQK having a Call Data ID="NULL", and having the oldest Timestamp, is chosen for selection. If no such ESQK has both Call Data ID=NULL and the oldest Timestamp is found, then the ESQK with merely the oldest Timestamp is selected.

8 Claims, 5 Drawing Sheets

(56) References Cited

U.S. PATENT DOCUMENTS

| | | |
|---|---|---|
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,166,972 A | 11/1992 | Smith |
| 5,717,688 A | 2/1998 | Belanger et al. |
| 6,108,533 A | 8/2000 | Brohoff |
| 6,128,664 A | 10/2000 | Yanagidate et al. |
| 6,134,316 A | 10/2000 | Kallioniemi |
| 6,181,939 B1 | 1/2001 | Ahvenainen |
| 6,253,074 B1 | 6/2001 | Carlsson |
| 6,278,701 B1 | 8/2001 | Ayyagari |
| 6,321,092 B1 | 11/2001 | Fitch |
| 6,360,102 B1 | 3/2002 | Havinis |
| 6,427,001 B1 | 7/2002 | Contractor |
| 6,526,026 B1 | 2/2003 | Menon |
| 6,529,490 B1 | 3/2003 | Oh et al. |
| 6,529,500 B1 | 3/2003 | Pandharipande |
| 6,529,722 B1 | 3/2003 | Heinrich |
| 6,539,232 B2 | 3/2003 | Hendrey et al. |
| 6,549,522 B1 | 4/2003 | Flynn |
| 6,564,261 B1 | 5/2003 | Gudjonsson |
| 6,587,691 B1 | 7/2003 | Granstam |
| 6,621,810 B1 | 9/2003 | Leung |
| 6,687,504 B1 | 2/2004 | Raith |
| 6,731,940 B1 | 5/2004 | Nagendran |
| 6,744,858 B1 | 6/2004 | Ryan |
| 6,757,266 B1 | 6/2004 | Hundscheidt |
| 6,775,267 B1 | 8/2004 | Kung |
| 6,775,534 B2 | 8/2004 | Lindgren |
| 6,795,444 B1 | 9/2004 | Vo |
| 6,813,264 B2 | 11/2004 | Vassilovski |
| 6,839,417 B2 | 1/2005 | Weisman |
| 6,847,618 B2 | 1/2005 | Laursen |
| 6,876,734 B1 | 4/2005 | Summers |
| 6,882,850 B2 | 4/2005 | McConnell et al. |
| 6,898,633 B1 | 5/2005 | Lyndersay |
| 6,912,230 B1 | 6/2005 | Salkini |
| 6,937,597 B1 | 8/2005 | Rosenberg |
| 6,940,826 B1 | 9/2005 | Simard |
| 6,940,950 B2 | 9/2005 | Dickinson et al. |
| 6,957,068 B2 | 10/2005 | Hutchinson |
| 6,968,044 B2 | 11/2005 | Beason |
| 6,985,747 B2 | 1/2006 | Chithambaram |
| 6,993,355 B1 | 1/2006 | Pershan |
| 7,072,667 B2 | 7/2006 | Olrik |
| 7,092,385 B2 | 8/2006 | Gallant |
| 7,106,717 B2 | 9/2006 | Rousseau |
| 7,136,466 B1 | 11/2006 | Gao |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,184,418 B1 | 2/2007 | Baba |
| 7,200,380 B2 | 4/2007 | Havlark |
| 7,245,900 B1 | 7/2007 | Lamb |
| 7,246,187 B1 * | 7/2007 | Ezra et al. ............... 710/200 |
| 7,260,186 B2 | 8/2007 | Zhu |
| 7,260,384 B2 | 8/2007 | Bales et al. |
| 7,269,428 B1 | 9/2007 | Wallenius |
| 7,302,582 B2 | 11/2007 | Snapp |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignano |
| 7,394,896 B2 | 7/2008 | Norton |
| 7,412,049 B1 | 8/2008 | Koch |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky et al. |
| 7,453,990 B2 | 11/2008 | Welenson |
| 7,495,608 B1 | 2/2009 | Chen |
| 7,522,581 B2 | 4/2009 | Acharya |
| 7,573,982 B2 | 8/2009 | Breen |
| 7,602,886 B1 | 10/2009 | Beech |
| 7,623,447 B1 | 11/2009 | Faccin |
| 7,702,081 B1 | 4/2010 | Klesper |
| 7,711,094 B1 | 5/2010 | Olshansky |
| 7,747,258 B2 | 6/2010 | Farmer |
| 7,764,961 B2 | 7/2010 | Zhu |
| 7,783,297 B2 | 8/2010 | Ishii |
| 7,787,611 B1 | 8/2010 | Kotelly |
| 7,792,989 B2 | 9/2010 | Toebes |
| 7,890,122 B2 | 2/2011 | Walsh |
| 7,895,263 B1 | 2/2011 | Kirchmeier |
| 8,308,570 B2 | 11/2012 | Fiedler |
| 2001/0040886 A1 | 11/2001 | Jimenez |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 * | 7/2002 | Leung ..................... 370/352 |
| 2002/0086659 A1 | 7/2002 | Lauper |
| 2002/0086676 A1 | 7/2002 | Hendry |
| 2002/0102996 A1 | 8/2002 | Jenkins |
| 2002/0118650 A1 | 8/2002 | Jagadeesan |
| 2002/0123327 A1 | 9/2002 | Vataja |
| 2002/0126656 A1 | 9/2002 | Park |
| 2002/0158777 A1 | 10/2002 | Flick |
| 2002/0173317 A1 | 11/2002 | Nykanen |
| 2002/0191595 A1 | 12/2002 | Mar |
| 2002/0197991 A1 | 12/2002 | Anvekar et al. |
| 2003/0009277 A1 | 1/2003 | Fan |
| 2003/0012148 A1 | 1/2003 | Peters |
| 2003/0026245 A1 | 2/2003 | Ejzak |
| 2003/0072318 A1 | 4/2003 | Lam |
| 2003/0086539 A1 * | 5/2003 | McCalmont et al. .......... 379/45 |
| 2003/0108176 A1 | 6/2003 | Kung |
| 2003/0109245 A1 | 6/2003 | McCalmont |
| 2003/0119528 A1 | 6/2003 | Pew |
| 2003/0186709 A1 * | 10/2003 | Rhodes et al. ............. 455/456.1 |
| 2004/0032485 A1 | 2/2004 | Stephens |
| 2004/0043775 A1 | 3/2004 | Kennedy |
| 2004/0047461 A1 | 3/2004 | Weisman |
| 2004/0076277 A1 | 4/2004 | Kuusinen |
| 2004/0143852 A1 | 7/2004 | Meyers |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0190497 A1 | 9/2004 | Knox |
| 2004/0192271 A1 | 9/2004 | Eisner |
| 2004/0198386 A1 | 10/2004 | Dupray |
| 2004/0229632 A1 | 11/2004 | Flynn |
| 2004/0267445 A1 | 12/2004 | De Luca |
| 2005/0020242 A1 | 1/2005 | Holland |
| 2005/0031095 A1 | 2/2005 | Pietrowics |
| 2005/0043038 A1 | 2/2005 | Maanoja |
| 2005/0053209 A1 | 3/2005 | D'Evelyn |
| 2005/0063519 A1 | 3/2005 | James |
| 2005/0078612 A1 | 4/2005 | Lang |
| 2005/0083911 A1 | 4/2005 | Grabelsky |
| 2005/0101335 A1 | 5/2005 | Kelly |
| 2005/0107673 A1 | 5/2005 | Ball |
| 2005/0119012 A1 | 6/2005 | Merheb |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0174991 A1 | 8/2005 | Keagy |
| 2005/0190892 A1 | 9/2005 | Dawson |
| 2005/0192822 A1 | 9/2005 | Hartenstein |
| 2005/0201358 A1 | 9/2005 | Nelson |
| 2005/0201528 A1 | 9/2005 | Meer |
| 2005/0201529 A1 | 9/2005 | Nelson |
| 2005/0213716 A1 | 9/2005 | Zhu |
| 2005/0232252 A1 | 10/2005 | Hoover |
| 2005/0255857 A1 | 11/2005 | Kim |
| 2005/0265318 A1 | 12/2005 | Khartabil |
| 2005/0271029 A1 | 12/2005 | Iffland |
| 2005/0282518 A1 | 12/2005 | D'Evelyn |

| | | |
|---|---|---|
| 2005/0287979 A1 | 12/2005 | Rollender |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0068753 A1 | 3/2006 | Karpen |
| 2006/0077911 A1 | 4/2006 | Shaffer |
| 2006/0078094 A1 | 4/2006 | Breen |
| 2006/0079330 A1 | 4/2006 | Dvorak |
| 2006/0088152 A1 | 4/2006 | Green |
| 2006/0120517 A1 | 6/2006 | Moon |
| 2006/0128395 A1 | 6/2006 | Muhonen |
| 2006/0135177 A1 | 6/2006 | Winterbottom |
| 2006/0154710 A1 | 7/2006 | Serafat |
| 2006/0188083 A1 | 8/2006 | Breen |
| 2006/0193447 A1 | 8/2006 | Schwartz |
| 2006/0224752 A1 | 10/2006 | Parekh |
| 2006/0239205 A1 | 10/2006 | Warren |
| 2006/0250987 A1 | 11/2006 | White |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026871 A1 | 2/2007 | Wager |
| 2007/0027997 A1 | 2/2007 | Polk |
| 2007/0036139 A1 | 2/2007 | Patel |
| 2007/0041513 A1 | 2/2007 | Gende |
| 2007/0054676 A1 | 3/2007 | Duan |
| 2007/0060097 A1 | 3/2007 | Edge |
| 2007/0081635 A1 | 4/2007 | Croak |
| 2007/0115941 A1 | 5/2007 | Patel |
| 2007/0121601 A1 | 5/2007 | Kikinis |
| 2007/0149166 A1 | 6/2007 | Turcotte |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1* | 8/2007 | Hines et al. ............... 379/37 |
| 2007/0206568 A1 | 9/2007 | Silver |
| 2007/0206613 A1 | 9/2007 | Silver |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0037715 A1 | 2/2008 | Prozeniuk |
| 2008/0045250 A1 | 2/2008 | Hwang |
| 2008/0059304 A1 | 3/2008 | Kimsey |
| 2008/0063153 A1 | 3/2008 | Krivorot |
| 2008/0065775 A1 | 3/2008 | Polk |
| 2008/0117859 A1 | 5/2008 | Shahidi |
| 2008/0146343 A1 | 6/2008 | Sullivan et al. |
| 2008/0162637 A1 | 7/2008 | Adamczyk |
| 2008/0176582 A1 | 7/2008 | Ghai |
| 2008/0186164 A1 | 8/2008 | Emigh |
| 2008/0200182 A1 | 8/2008 | Shim |
| 2008/0214202 A1 | 9/2008 | Toomey |
| 2009/0003535 A1 | 1/2009 | Grabelsky |
| 2009/0067417 A1 | 3/2009 | Kalavade |
| 2009/0097450 A1 | 4/2009 | Wallis |
| 2009/0128404 A1 | 5/2009 | Martino |
| 2009/0216798 A1* | 8/2009 | Wahlert et al. ............ 707/103 R |
| 2009/0323636 A1 | 12/2009 | Dillon |
| 2010/0003976 A1 | 1/2010 | Zhu |
| 2010/0054220 A1 | 3/2010 | Bischinger et al. |
| 2010/0067444 A1 | 3/2010 | Faccin |
| 2010/0119049 A1 | 5/2010 | Clark |
| 2010/0167760 A1 | 7/2010 | Kim |
| 2010/0178973 A1 | 7/2010 | Snoddy et al. |
| 2010/0188992 A1 | 7/2010 | Raleigh |
| 2010/0198933 A1 | 8/2010 | Smith |
| 2010/0218664 A1 | 9/2010 | Toledano et al. |
| 2010/0223222 A1 | 9/2010 | Zhou et al. |
| 2010/0328093 A1 | 12/2010 | Robinson et al. |
| 2011/0149953 A1 | 6/2011 | Helgeson et al. |
| 2013/0012232 A1 | 1/2013 | Titus et al. |
| 2013/0072308 A1 | 3/2013 | Peck et al. |
| 2013/0079152 A1 | 3/2013 | Hall |

OTHER PUBLICATIONS

Office Letter in Japanese Patent Application No. 2006-542691 dated Sep. 7, 2009.
JP Laid-Open Gazette No. 2004-158947 (English abstract only).
JP Laid-Open Gazette No. 2007-507123 (counterpart English text US Patent Application Publication No. 2007/0054676).
T. Hattori, "Wireless Broadband Textbook," IDG Japan, Jun. 10, 2002, p. 142-p. 143. (no English text).
Yilin AHAO, Efficient and reliable date transmission for cellular and GPS based mayday systems, Nov. 1997, IEEE, IEEE Conference on Intelligent Transportation System, 1997. ITSC 97, 555-559.
Extended European Search Report from EPO in European Appl. No. 06827172.5 dated Dec. 29, 2009.
Location Based Services V2 Roaming Support (non proprietary), 80-V8470-2NP A, dated Jan. 27, 2005, pp. 1-56.
Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.
Schulzrinne et al., Emergency Services for Internet Telephony Systems draft-schulzrinne-sipping-emergency-arch, IETF Standard Working Draft, Feb. 4, 2004, 1-22.
International Search Report received in PCT/US2011/02001 dated Apr. 27, 2012.
International Search Report received in PCT/US2011/000100 dated Apr. 24, 2012.
International Search Report received in PCT/US2011/001990 dated Apr. 24, 2012.
International Search Report received in PCT/US11/01971 dated Feb. 28, 2013.

* cited by examiner

ESQK Data Store

| ESQK Pool ID | ESQK | Timestamp | Call Data ID | |
|---|---|---|---|---|
| 1 | 11111111111 | Yesterday @ 10:11 PM | NULL | ~301 |
| 1 | 22222222222 | Today @ 9:00 AM | NULL | ~302 |
| 2 | 33333333333 | Two days ago @ 8:00 AM | 1234 | ~303 |
| 2 | 44444444444 | Today @ 11:59 AM | 5678 | ~304 |

Sample ESQK Data Store Contents

FIG. 2

EFFICIENT USAGE OF EMERGENCY SERVICES KEYS

The present application claims priority from U.S. Provisional Application No. 60/797,359, filed May 4, 2006 entitled "Optimal Selection of a Limited Sized Pool of Unique Numbers", by Geldenbott et al., the entirety of which is expressly incorporated herein by reference.

BACKGROUND OF THE INVENTION

1. Field of the Invention

This invention relates generally to long distance carriers, Internet Service Providers (ISPs), and information content delivery services/providers and long distance carriers. More particularly, it relates to emergency call systems (e.g., E9-1-1) including wireless and Internet Protocol (IP) based Voice Over Internet Protocol (VoIP) emergency call systems.

2. Background of Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VOIP networks. Regardless of the network type, a 9-1-1 service becomes E-9-1-1 when automatic number identification and automatic location information related to the call is provided to the 9-1-1 operator at the PSAP.

A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VOIP term.

FIG. 4 shows a conventional landline public safety access point (PSAP) to automatic location identifier (ALI) connection.

In particular, FIG. 4 shows a PSAP 400 connected to one Automatic Location Identifier (ALI) database 401. An ALI is a database that accepts a PSAP query with telephone number, relates the telephone number to an address and provides that address (location information) back to the PSAP in a manner that works for the customer premise equipment (CPE) display. An ALI is typically owned by a LEC or a PSAP, and may be regional (i.e. connected to many PSAPs) or standalone (i.e. connected to only one PSAP). There is no one single standard interface protocol for PSAP-ALI connection/communication.

Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

FIG. 5 shows a context diagram for a conventional non-landline positioning center (e.g., an Internet based voice over Internet Protocol (VOIP) positioning center).

In particular, the ALI database 401 includes a conventional emergency services key (ESQK or ESRK) in a location request sent to an appropriate positioning center 402 (XPC). The emergency services key (ESQK or ESRK) is used by the positioning center 402 as a key to look up the location and other call information associated with the emergency call.

In non-landline telephony, the PSAPs 400 query the ALI 401 for location information. However, the ALI 401 is not pre-provisioned with location data for non-landline calls (e.g. cellular, VOIP etc) and must communicate with other network entities to obtain and deliver location data to the PSAP 400.

Non-landline telephony standards (e.g. cellular, VoIP etc) have mandated that ALIs 401 maintain connectivity to a positioning center 402 that is able to provide current location data for a non-landline call. In the current state of technology, the positioning center 402 provides the caller's location and the callback number to the ALI, which passes it to the requesting PSAP. As can be seen in FIG. 5, an ALI may maintain connectivity to more than one positioning center via multiple interface types—both standard and non-standard (e.g. NENA-02, E2/E2+/V−E2(ESP), PAM, etc.).

Whether landline or non-landline, conventional emergency call centers, e.g., public safety access points (PSAPs) 400, use emergency services keys such as an emergency services query key (ESQK) or an emergency services routing key (ESRK), collectively referred to herein as ESxK, to query for location information. An emergency services key identifies an emergency call, and is associated with a particular selective router 417 associated with a given public safety access point (PSAP) 400. The emergency services keys ESQK and ESRK are conventionally used to query the automatic location identification (ALI) database 401 for the location of a given emergency caller. An emergency services key is delivered to the E9-1-1 selective router 417 and is the calling number/ANI for the call to the PSAP 400. The emergency services key is used by a selective router 417 as a key to selective routing data associated with the emergency call. The emergency services key is delivered by the selective router 417 to a PSAP 400 as the calling number/ANI for the emergency call, and is subsequently used by the PSAP 400 to request automatic location information (ALI) information indicating the location of the device making the emergency call. Conventional emergency services keys conform to ten-digit North American Numbering Plan Number definitions.

Existing, standardized solutions prescribe a finite pool of emergency services keys (ESQK and ESRK) which are allocated individually, one associated for each emergency call in progress. ESxK numbers are used to request updated location information from the ALI 401 while an emergency call is active, and as such, as appreciated by the inventors hereof, are subject to number exhaustion if the number of active emergency calls exceeds the number of ESxKs in the pool. But because ESxKs (ESQKs and ESRKs) are dynamically assigned at the time of call origination, and because the pool of ESxKs is limited, the inventors appreciate that it is possible for the pool of available ESxKs to run out.

For systems which implement ESQK and/or ESRK keys, it is a well known technique to use timers and default ESxKs to avoid problems associated with a limited pool of ESxKs. Timers have been specified and implemented to limit the amount of time that an ESxK can remain allocated to an emergency call, without regard for the actual call duration. For example, if a call continues after the timer has expired; the specific ESxK which was used to obtain updated location information can get reassigned to a new incoming emergency call.

However, timers are based solely on estimated call duration, a value which could be exceeded. Since emergency calls are numerous, and can remain active for long periods of time once initiated, some service providers have increased the number of allocated ESxK pools in an effort to minimize number pool exhaustion. Additionally, reliance on timers requires much larger pools of ESxKs to be allocated, which is an inefficient use of numbers, and may potentially lead to number exhaustion.

The conventional technique of using timers to expire the ESQK and ESRK allocation could prove to be devastating if a given emergency call using that expiring ESxK is still active. This is especially true if there is updated location information which would help provide emergency assistance to the caller.

Moreover, ESxK numbers must be purchased, so large numbers of ESxKs represent a direct cost to a provider. Also, as requirements for capacity increase, existing systems must often increase the size of the ESQK and ESRK number pool that they purchase, leading to additional costs for ESQK and ESRK number purchases, additional costs to implement, and additional costs to maintain these larger number pool sizes.

Thus, emergency services keys, e.g., the emergency services query key (ESQK) or the emergency services routing key (ESRK), identify a call instance at a VoIP positioning center (VPC). The ESQK is selected from a pre-provisioned pool by the VPC and delivered to the PSAP (Public Safety Answering Point) as the calling number for an emergency call. The ESQK is subsequently used by the PSAP to request ALI (Automatic Location Identification) information for the call from the VPC. The ESQK is used by the VPC as a key to look up the location object and other call information associated with the emergency call instance. This information is returned to the PSAP.

The size of an ESQK pool is limited for VoIP emergency calls. During normal operation emergency calls are associated with an ESQK as long as the emergency call is in process. As soon as the call is terminated, the ESQK is "released" and marked as free. Once all pre-provisioned ESQKs have been associated with emergency calls they are marked as "unavailable/in-use." New incoming emergency calls coming in at that time must still be served and assigned an ESQK from the given pre-provisioned pool.

Currently systems conform to NENA VoIP Architecture For Enhanced 9-1-1 Services, NENA standard 08-001. However, such systems are complicated in nature, and thus not practical.

There is a need for a more efficient use of available emergency services keys.

SUMMARY OF THE INVENTION

In accordance with the principles of the present invention, apparatus and a method for selecting an emergency services key from a limited size pool comprises first attempting selection of an emergency services key from a limited size pool containing a plurality of emergency services keys, having an indication of not being currently associated with an emergency call, and having an oldest timestamp associated therewith from among those in the pool. In the event that no emergency services key in the pool meets the first attempt selecting criteria, second attempting selection of the emergency services key from the limited size pool having merely an oldest timestamp associated therewith from among those in the pool. In this way, selection of the emergency services key is ensured from the limited size pool is assured to be available when selected.

BRIEF DESCRIPTION OF THE DRAWINGS

Features and advantages of the present invention will become apparent to those skilled in the art from the following description with reference to the drawings:

FIG. 2 shows an exemplary ESQK data store contents, in accordance with the principles of the present invention.

DETAILED DESCRIPTION OF ILLUSTRATIVE EMBODIMENTS

The present invention provides for the management of a limited size emergency services key pool (e.g., an ESQK pool) in such a way as to ensure that an ESQK can always be handed out to an incoming emergency call, even if all ESQK pool members are marked as unavailable. The invention applies equally to efficient use of emergency services routing keys (ESRKS) used in the wireless industry where the gateway mobile location centre (GMLC) takes the functional role of the voice over Internet Protocol (VOIP) positioning center (VPC). Ultimately the invention applies to any limited size pool of unique numbers that need to be dynamically allocated to a resource for a limited time in such a way to always guarantee the availability of a pool element.

Figure 1:
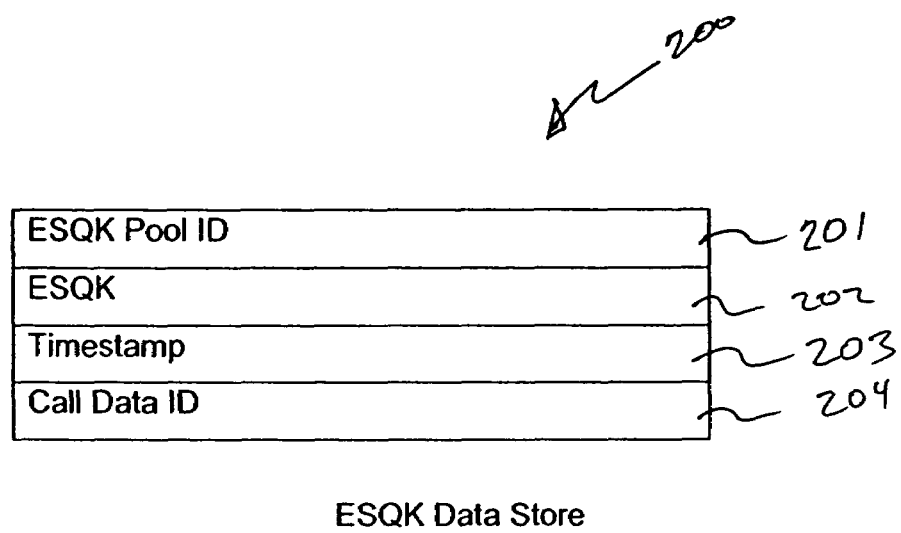
FIG. 1 shows an exemplary ESQK data store, in accordance with the principles of the present invention.

Selecting an ESQK from a Pool:

FIG. 1 shows an exemplary ESQK data store 200, in accordance with the principles of the present invention.

In particular, as shown in FIG. 1, a plurality of ESQKs are grouped into a pool of emergency service keys, identified herein with an "ESQK Pool ID" 201.

The ESQK pool ID includes ESQK(s) 202. The ESQKs 202 element of the ESQK data store 200 is capable of containing anywhere from 1 to N number of ESQKs, N being any number greater than 1, as depicted row 202 of FIG. 1.

The size of N is limited by network factors, such as the size of a database, but mostly based on the number of ESQKs assigned for use by the given network element.

Each ESQK 202 preferably has a "Timestamp" associated therewith, as shown in row 203. The timestamp preferably relates to a representation of the current time of day of assignment to a specific emergency E911 call.

Each ESQK 202 also includes information relating to the specific emergency E911 call, referred to herein as "Call Data ID", as depicted in row 204 of FIG. 1. The Call Data ID information identifies the specific emergency E911 call.

FIG. 2 shows exemplary contents of an ESQK data store 200 in more detail, in accordance with the principles of the present invention.

In particular, as shown in FIG. 2, an exemplary ESQK Data Store includes two (2) ESQK pools: ESQK pool #1 (rows 301 and 302) and ESQK pool #2 (rows 303 and 304). Each of the exemplary ESQK pools #1 and #2 contain two ESQKs, as shown in column 202.

Figure 3:
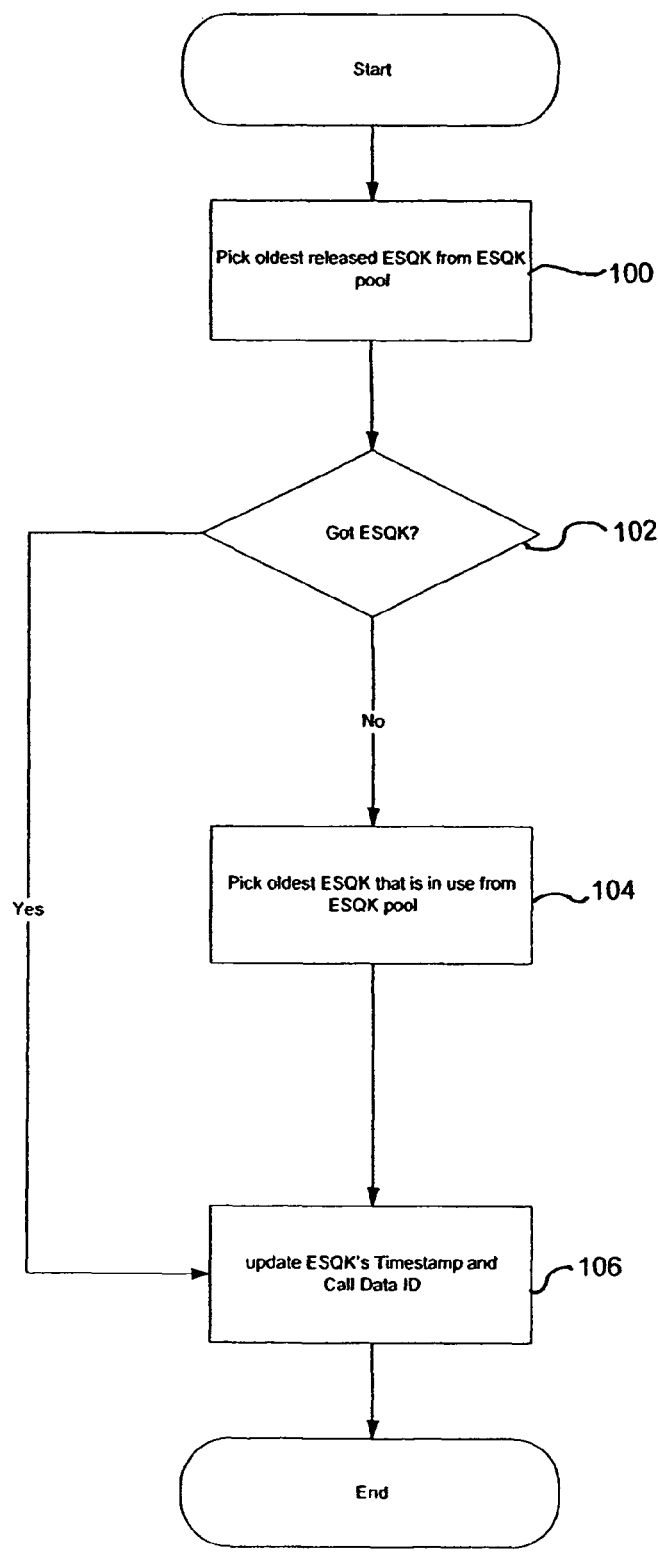
FIG. 3 illustrates exemplary selection of an emergency services key (e.g., an emergency services query key (ESQK)) from a pool of ESQK keys, in accordance with the principles of the present invention.
Figure 4:
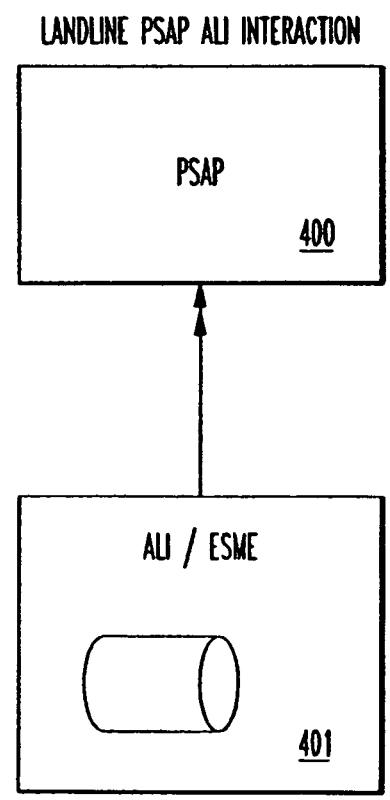
FIG. 4 shows a conventional landline public safety access point (PSAP) to automatic location identifier (ALI) connection.
Figure 5:
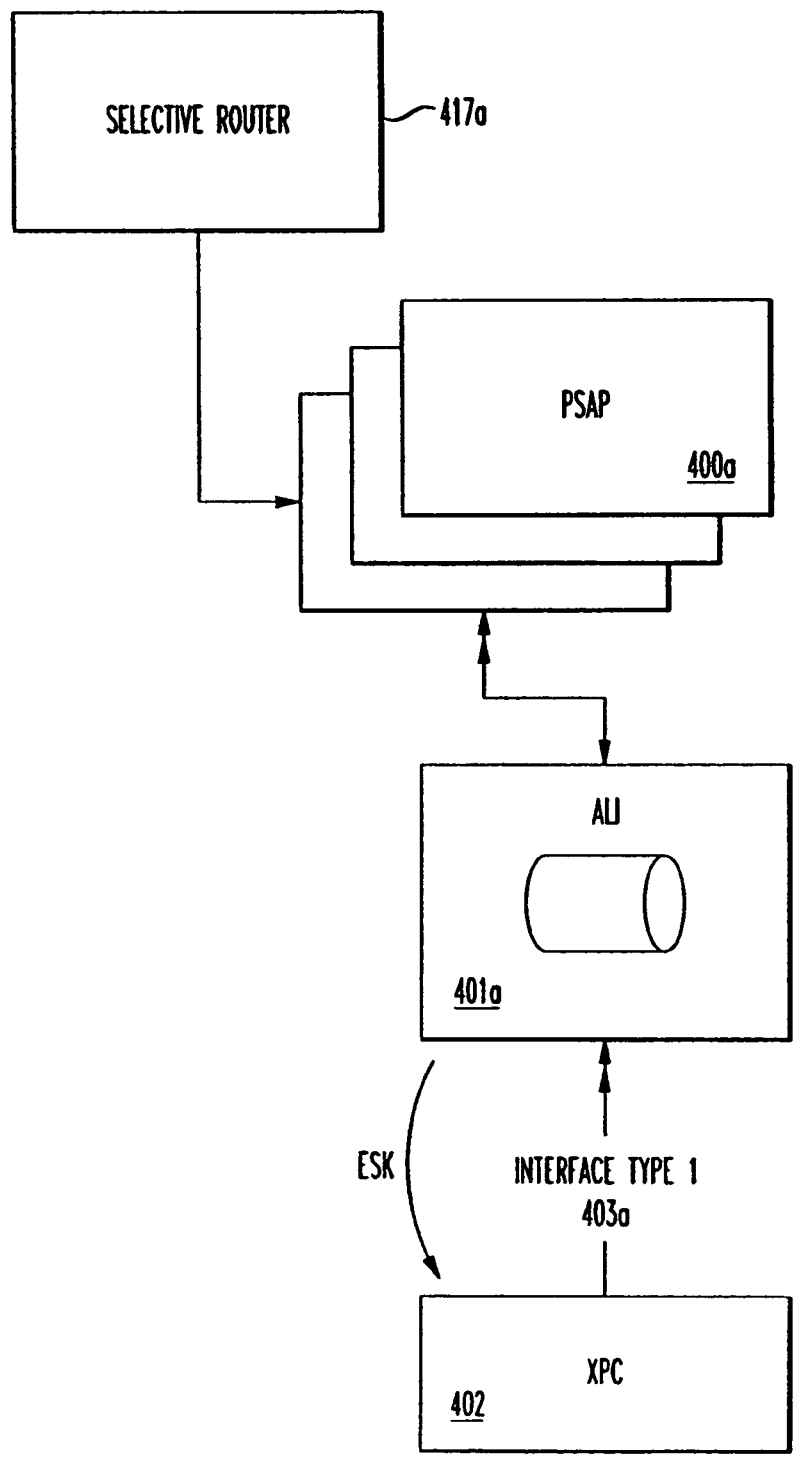
FIG. 5 shows a context diagram for a conventional non-landline positioning center (e.g., an Internet based voice over Internet Protocol (VOIP) positioning center).

FIG. 3 illustrates an exemplary selection of an emergency services key (e.g., an emergency services query key (ESQK)) from a pool of ESQK keys, in accordance with the principles of the present invention.

In particular, as shown in FIG. 3, an ESQK is picked as follows for a given ESQK pool.

In step 100 of FIG. 3, the ESQK in the ESQK pool having a Call Data ID equal to "NULL" (NULL is used as a synonym for "not set" in this context), and having the oldest Timestamp, is chosen for selection.

In decision step 102, it no such ESQK having both Call Data ID=NULL and the oldest Timestamp is found in the given ESQK pool 200, then the method moves to step 104 where the ESQK with merely the oldest Timestamp is selected.

The inherent logic is that in the latter scenario ESQKs that are no longer associated with active emergency calls are still incorrectly marked to be in use for whatever system related issues. This logic is no longer true under extreme conditions, such as an ESQK pool sized too small, or extremely high call volume, typically generated in a lab stress test environment. For most practical purposes the likelihood of this happening is extremely low. In this way, the inventive method always guarantees the selection of an ESQK as long as the number of ESQKs in a given pool is >=1.

In step 106, the Timestamp and Call Data ID are preferably updated.

Returning an ESQK to a Pool:

When an emergency call is terminated the ESQK that has been associated with this call up to that point is released. To achieve this, the ESQK record is retrieved from the ESQK data store 200, and the Call Data ID 204 parameter for that particular ESQK record is set to NULL.

However, in the call termination process, the Timestamp 203 parameter for that ESQK record is left unchanged. In this way, the ESQK record that was used retains the Timestamp of the last time it was selected.

As an example use of the inventive method, a request for an ESQK from ESQK pool #1 shown earlier in FIG. 2 would follow the method described and shown with respect to FIG. 3. In the given example, ESQK "11111111111" (row 301) would be chosen since it has a Call Data ID=NULL, and the oldest Timestamp.

A request for an ESQK from ESQK pool #2 would also follow the method described and shown with respect to FIG. 3. All ESQKs in ESQK pool #2 as depicted still have a value assigned as a Call Data ID. For instance, the ESQK in row 303 has a Call Data ID=1234, and the ESQK in row 304 has a Call Data ID=5678. Because the values for these Call Data ID is NOT NULL, they are both considered to be marked as "in-use" as referred to herein.

In this particular example, ESQK "33333333333" (row 303) would be chosen since no ESQK in the ESQK pool (i.e., ESQK pool #2) has a Call Data ID=NULL, and that ESQK (i.e., ESQK "3333333333" (row 303) is the ESQK in that ESQK pool having the oldest Timestamp. In this example, the oldest Timestamp is "Two days ago @8:00 AM".

While the Timestamp is represented as "Two days ago @8:00 AM", it is entirely within the principles of the present invention that other representations for a Timestamp are possible. For instance, the Timestamp may be represented in YYYY/MM/DD/HH/MM/SS format, or equivalent, as an example.

Accordingly, the invention guarantees that for a limited size ESQK pool, an ESQK can always be selected and associated with an ongoing emergency call with no measurable impact to existing calls.

While the disclosed examples relate to the selection of an emergency services query key (ESQK), the present invention is equally applicable to the selection of an emergency services routing key (ESRK).

While the invention has been described with reference to the exemplary embodiments thereof, those skilled in the art will be able to make various modifications to the described embodiments of the invention without departing from the true spirit and scope of the invention.

What is claimed is:

1. A method of selecting an emergency services key from a limited size pool, comprising:

first attempting selection of an emergency services key, from a limited size pool, marked as not currently associated with an emergency call and having an oldest timestamp from among those in said limited size pool; and when no emergency services key in said limited size pool is selected with said first attempting selection, second attempting selection of said emergency services key, from said limited size pool, marked as currently associated with an emergency call and having an oldest timestamp from among those in said limited size pool;

whereby selection of said emergency services key is ensured from said limited size pool and is assured to be available when selected; and wherein said emergency services key is useable by a physical positioning center to obtain location information associated with said emergency call.

2. The method of selecting an emergency services key from a limited size pool according to claim 1, wherein:

said emergency services key is an emergency services query key (ESQK).

3. The method of selecting an emergency services key from a limited size pool according to claim 1, wherein:

said emergency services key is an emergency services routing key (ESRK).

4. The method of selecting an emergency services key from a limited size pool according to claim 1, wherein:

said indication contains a NULL if not currently associated with an emergency call.

5. Apparatus for selecting an emergency services key from a limited size pool, comprising:

means for first attempting selection of an emergency services key, from a limited size pool, marked as not currently associated with an emergency call and having an oldest timestamp from among those in said limited size pool; and means for second attempting selection of said emergency services key, from said limited size pool, marked as currently associated with an emergency call and having an oldest timestamp from among those in said limited size pool, when no emergency services key in said limited size pool is selected with said first attempting selection;

whereby selection of said emergency services key is ensured from said limited size pool and is assured to be available when selected; and wherein said emergency services key is useable by a physical positioning center to obtain location information associated with said emergency call.

6. The apparatus for selecting an emergency services key from a limited size pool according to claim 5, wherein:

said emergency services key is an emergency services query key (ESQK).

7. The apparatus for selecting an emergency services key from a limited size pool according to claim 5, wherein:

said emergency services key is an emergency services routing key (ESRK).

8. The apparatus for selecting an emergency services key from a limited size pool according to claim 5, wherein:

said indication contains a NULL if not currently associated with an emergency call.

* * * * *